(12) United States Patent
Shibutani et al.

(10) Patent No.: US 6,840,681 B2
(45) Date of Patent: Jan. 11, 2005

(54) TANDEM TYPE OPTICAL CONNECTOR

(75) Inventors: Michitomo Shibutani, Tokyo (JP); Isamu Inokoshi, Tokyo (JP); Katsuya Ezawa, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 115 days.

(21) Appl. No.: 10/243,922

(22) Filed: Sep. 16, 2002

(65) Prior Publication Data

US 2003/0053760 A1 Mar. 20, 2003

(30) Foreign Application Priority Data

Sep. 17, 2001 (JP) .......................................... 2001-281247

(51) Int. Cl.[7] .................................................. G02B 6/36
(52) U.S. Cl. ....................................................... 385/53
(58) Field of Search ...................... 385/88–99, 134–139, 385/1, 50–55, 70–75, 147

(56) References Cited

U.S. PATENT DOCUMENTS

| | | | | |
|---|---|---|---|---|
| 5,121,454 A | * | 6/1992 | Iwano et al. .................. | 385/60 |
| 5,142,606 A | * | 8/1992 | Carney et al. ............... | 385/134 |
| 5,231,687 A | * | 7/1993 | Handley ...................... | 385/139 |
| 5,601,451 A | * | 2/1997 | Driones et al. ............. | 439/490 |
| 5,708,742 A | | 1/1998 | Sobel | |
| 6,066,001 A | | 5/2000 | Liptak | |
| 6,160,946 A | | 12/2000 | Johnson | |
| 6,565,268 B2 | * | 5/2003 | Nakura et al. ................ | 385/94 |
| 6,601,995 B1 | * | 8/2003 | Harrison et al. .............. | 385/77 |
| 6,621,974 B1 | * | 9/2003 | Chu ........................... | 385/135 |
| 6,655,855 B2 | * | 12/2003 | Nakura et al. ................ | 385/92 |

FOREIGN PATENT DOCUMENTS

| | | |
|---|---|---|
| EP | 0927899 | 7/1999 |
| WO | WO 01 40839 | 6/2001 |

* cited by examiner

Primary Examiner—Akm Enayet Ullah
(74) Attorney, Agent, or Firm—Takeuchi & Takeuchi

(57) ABSTRACT

A tandem type optical connector (11) includes at least one tandem type adaptor (13) having opposite plug engaging cavities (19) each receiving an optical cable connector (14, 14') and a shield cover (20, 31) provided over the adaptor (13) and having at least one panel fixing member (21) to attach the optical connector (11) to a panel at an angle other than right angles with respect to the panel (12).

4 Claims, 7 Drawing Sheets

TANDEM TYPE OPTICAL CONNECTOR

BACKGROUND OF THE INVENTION

1. Field of the Invention

The present invention relates to an optical connector system, especially to a shield structure of an optical connector system provided in a panel, being inclined with respect to the vertical direction.

2. Description of the Related Art

An optical connector has been used in the optical communication system for connecting optical cables or an optical cable and other optical device for plugging and unplugging. The optical connector is provided on an outer panel of an exchanger, being inclined with respect to the vertical direction so that a laser beam of high output does not enter operator's eyes during the connection work of the optical connector.

Such an optical connector is described in Japanese Kokai No. 2001-147269. In FIG. 7, an outer panel 2 of equipment 1 is bent and a plurality of, or four in the drawing, adapters 3 of the optical connectors are fixed to the outer panel 2, being inclined downwardly.

However, in the conventional optical connector, parts of the outer panel 2, to which the adapters 3 are fixed, are bent, and, therefore, it is difficult to provide the shield of the optical connector. Also, since the adapters 3 are fixed to the bent parts of the outer panel 2, a space is required between the adapters 3 for fixing the adapters 3, making it difficult to increase the assembling density. In addition, the adapters 3 are fixed to the outer panel 2 individually and the outer panel is required to be bent, the assembling work needs long time.

SUMMARY OF THE INVENTION

Accordingly, it is an object of the present invention to provide an optical connector system, which makes the shielding easy, increases the assembling density, and simplifies the fixing and bending works.

According to the present invention, an optical connector system comprises at least one optical connector provided through a panel and inclined with respect to the direction and a shield cover provided outside the optical connector.

It is preferable that the optical connector is fixed to the panel by the shield cover.

A plurality of the optical connectors are connected with each other in a shape of step and the shield cover integrally shields the connected optical connectors.

The shield cover is provided such that it goes through the panel with the optical connector.

The shield cover has a stepped rectangular parallelepiped shape and is provided on optical connector an outside wall surface of the optical connector.

The shield cover is provided on optical connector an outside wall surface of one side of the optical connector, which projects from the panel.

The shield cover is further provided on an end surface of the optical connector.

According to the present invention, since the adapters fixed to the panel are shielded by the shield cover, excellent shield effect is achieved.

DESCRIPTION OF THE PREFERRED EMBODIMENTS

Embodiments of the invention will now be described referring to the accompanying drawings.

Figure 1:
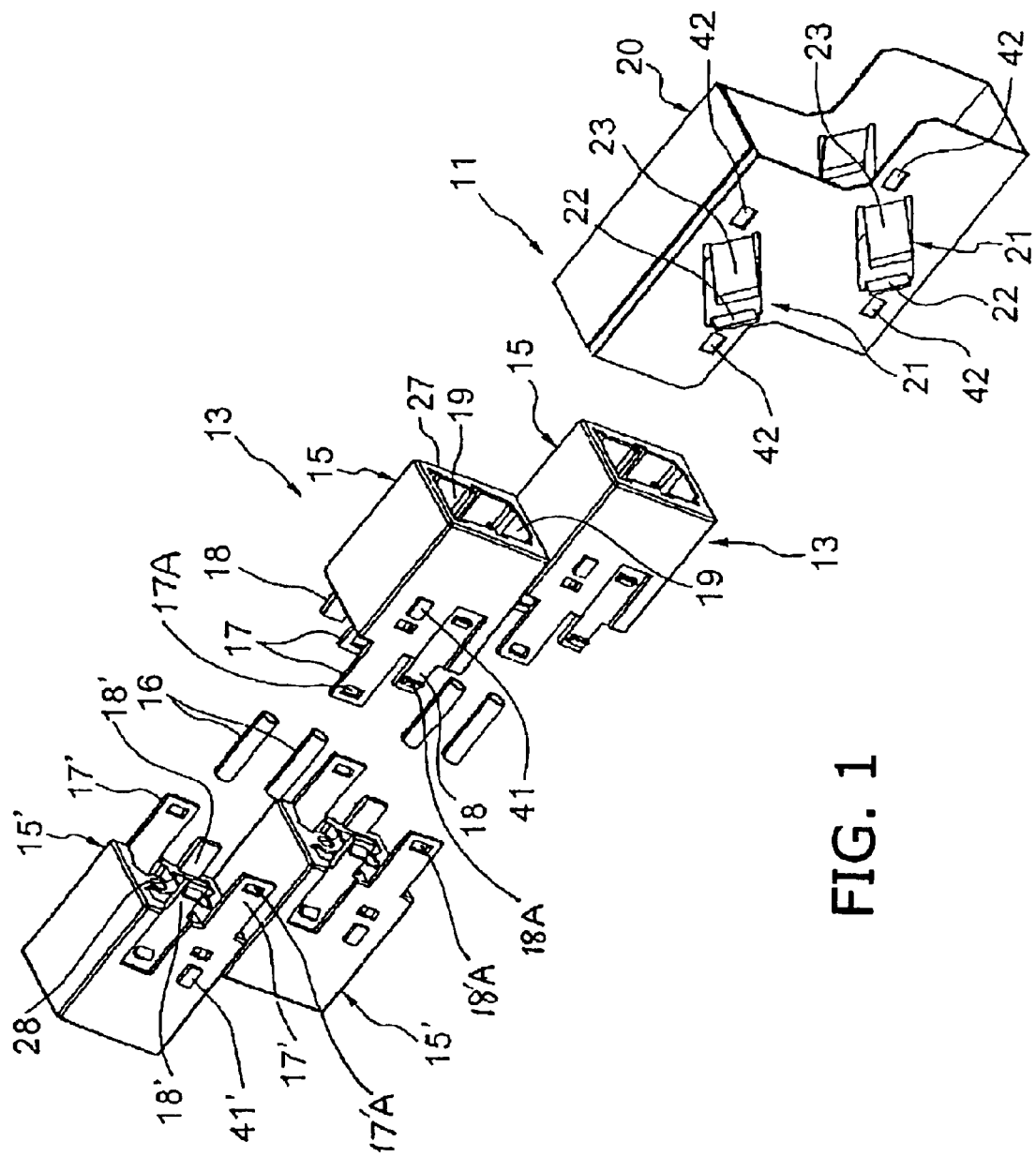
FIG. 1 is an exploded perspective view of a shield structure for an optical connector according to an embodiment of the present invention.
Figure 2:
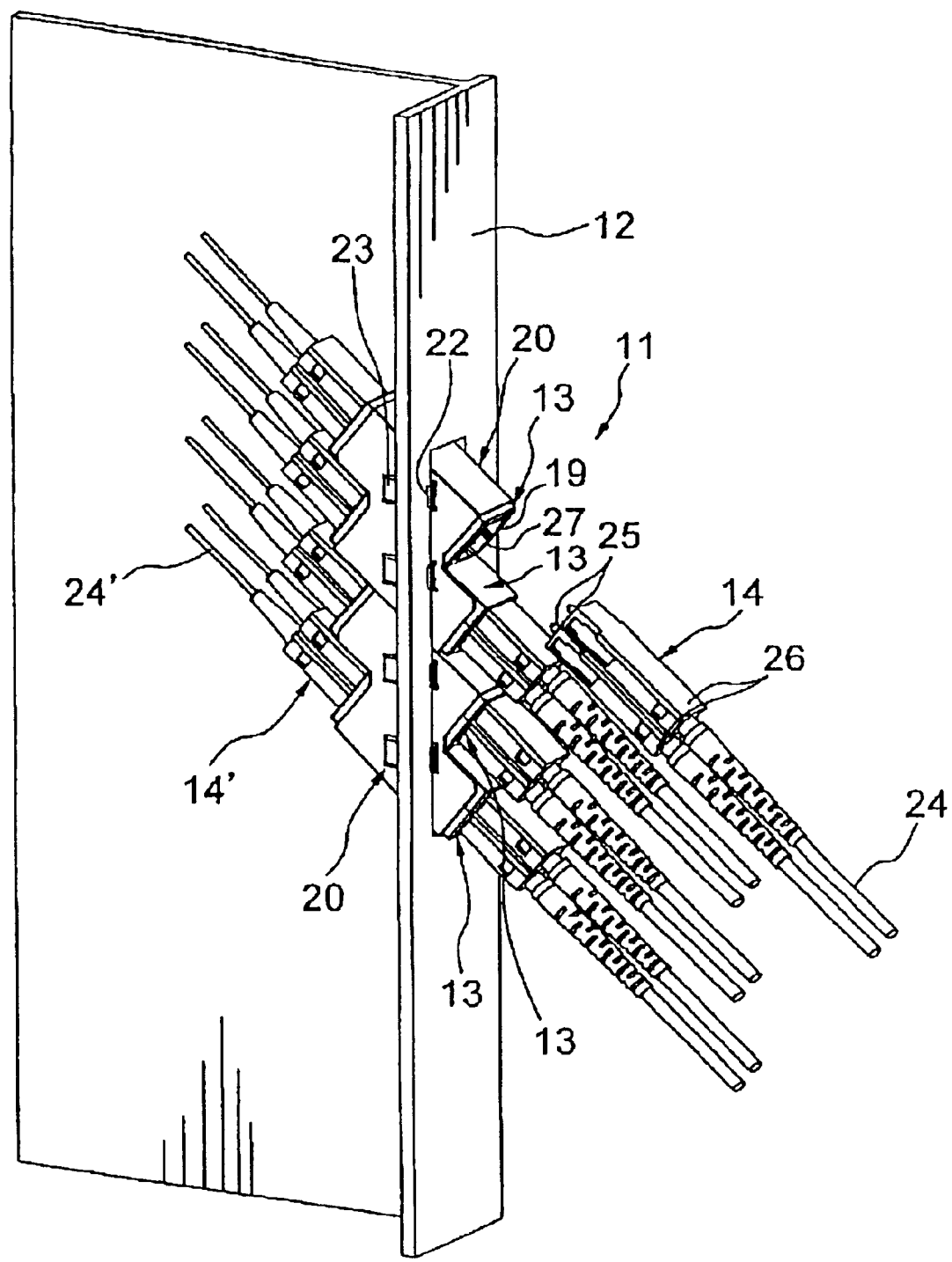
FIG. 2 is a perspective view of the shield structure.

In FIGS. 1 and 2, an optical connector 11 according to an embodiment of the invention comprises an adapter (adaptor) 13 provided through a panel 12 such that the adapter 13 is inclined in the vertical direction, and a plug 14 detachably attached to the adapter 13.

The adapter 13 is of the tandem type and comprises a pair of adapter bodies 15 and 15' made of a plastic and having the same shape, and two cylindrical adjusting sleeves 16. Engaging projections 41 and 41' are provided on sides of the adapter bodies 15 and 15', respectively. A pair of first cantilever engaging terminals 17 or 17' having engaging holes 17A or 17'A at the top and base portions thereof and second cantilever engaging terminals 18 or 18' having engaging projections 18 or 18'A at the top and base portions thereof are provided on the opposite sides of the adapter bodies 15 or 15', respectively. The first and second adapter bodies 15 and 15' are joined by the engagement between the engaging holes 17A or 17'A and the engaging projections 18A or 18'A. The adjusting sleeves 16 are movably held in sleeve accommodating slots 28 provided in the adapter 15 and 15'. Plug engaging cavities 19 are provided in two tiers at the end of each of the adapter bodies 15 and 15'.

A shield cover 20 made of a metal is provided outside the adapter 13. The shield cover 20 has a shape of stepped rectangular parallelepiped and is provided on an outside wall surface of the two connected adapters 13 to shield them integrally. Panel fixing members 21 are provided on opposite sides of the shield cover 20 such that the panel fixing members 21 are inclined at a predetermined angle, for example 45°, with respect to the insertion direction of the plug 14. Each panel fixing member 21 comprises a panel receiving piece 22 bent outwardly at substantially right angles and a cantilever spring 23 bent slightly outwardly. Accordingly, the adapter 13 and the shield cover 20 are attached to the panel 12 in the inclined condition when the panel 12 is held between the panel receiving piece 22 and the cantilever spring 23. Engaging holes 42 and 42' are provided in opposite sides of the shield cover 20 at positions corresponding to the engaging projections 41 and 41' so that the adapter bodies 15 and 15' are held in the shield cover 20 by the engagement between the engaging holes 42 and projection 41.

In FIG. 2, two shield covers 20 are connected in tires and attached to the panel 12. Each shield cover 20 accommodates two tandem adapters 13 and each adapter 13 is engaged with the plug 14. The plug 14 is a twin core plug and comprises two ferules 25 to accommodate an end of a core wire (not shown) of an optical cable 24 and two housings 26 to movably accommodate the ferules 25.

When the plugs 14 are upwardly inserted into the plug engaging cavities 19 outside the panel 12 and the plugs 14' are downwardly inserted into the plug engaging cavities 19' inside the panel 12, each of the ferules 25 of the plugs 14 and 14' is aligned and held in the adjusting sleeves 16, and abuts against each other. Thus, the plugs 14 and 14' are connected to each other through the adapter 13. Since the adapter 13 is installed to the panel 12 on the slant, no that light enters operator's eyes during the connection work of the plugs 14 and 14', thus protecting the operator's eyes. Since a plurality of the adapters 13 are integrally connected with each other, the assembling density is increased, and since the panel 12 does not require the complicated process, such as bending work, the manufacturing of the panel 12 is easy.

As described above, the adapter 13 is attached to the panel 12 by the panel receiving piece 22 and the cantilever spring 23 of the shield cover 20. However, other method may be used. For example, the shield cover 20 may be attached to the panel 14 by a screw, a fixing member other than the shield cover 20 may be employed, or the adapter 13 itself may have a fixing member, such as a screw, to be directly installed to the panel 12.

Figure 3:
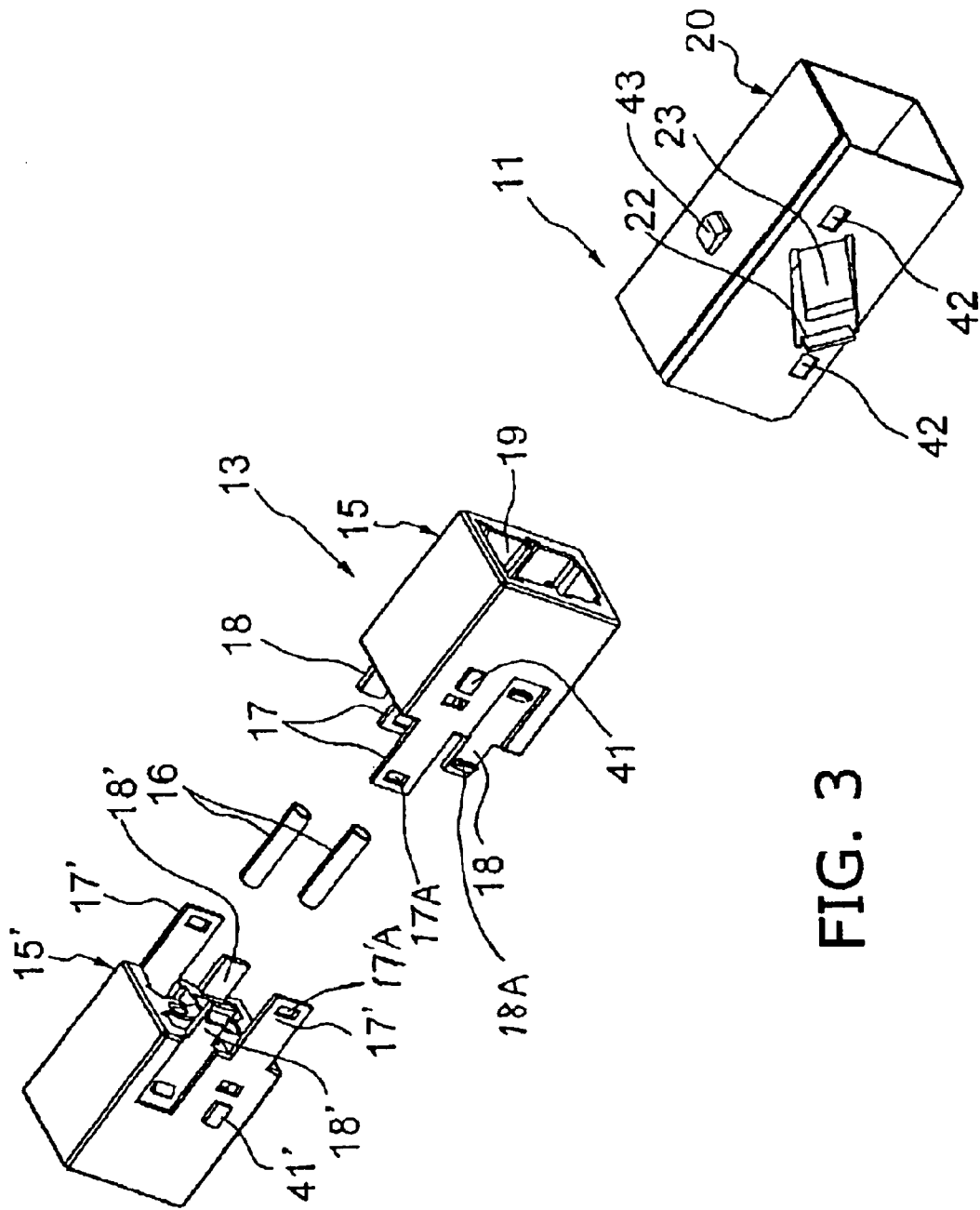
FIG. 3 is an exploded perspective view of a shield structure for an optical connector according to a modification to the embodiment of the present invention.

Also, in the above embodiment, the shield cover 20 integrally coves the two adapters 13, however, the shield cover 20 is made to cover each individual adapter 13 as shown in FIG. 3. In this case, it is preferable that a connecting member 43 and a connecting recess (not shown) engageable with the connecting member 43 are provided on an upper and lower surfaces of the shield cover 20. Three or more of the adapters 13 may be integrally shielded by the shield cover 20. The adapter 13 may not be of the tandem type.

The shield cover 20 may be provided on end surfaces 27 of the adapter 13 as well as the peripheral wall surface of the adapter 13. The Shape of the shield cover 20 is not limited to the stepped rectangular parallelepiped, but any shape may be employed, which permits the adapter 13 to be installed to the panel 12 at an inclined position with respect to the vertical direction.

Figure 4:
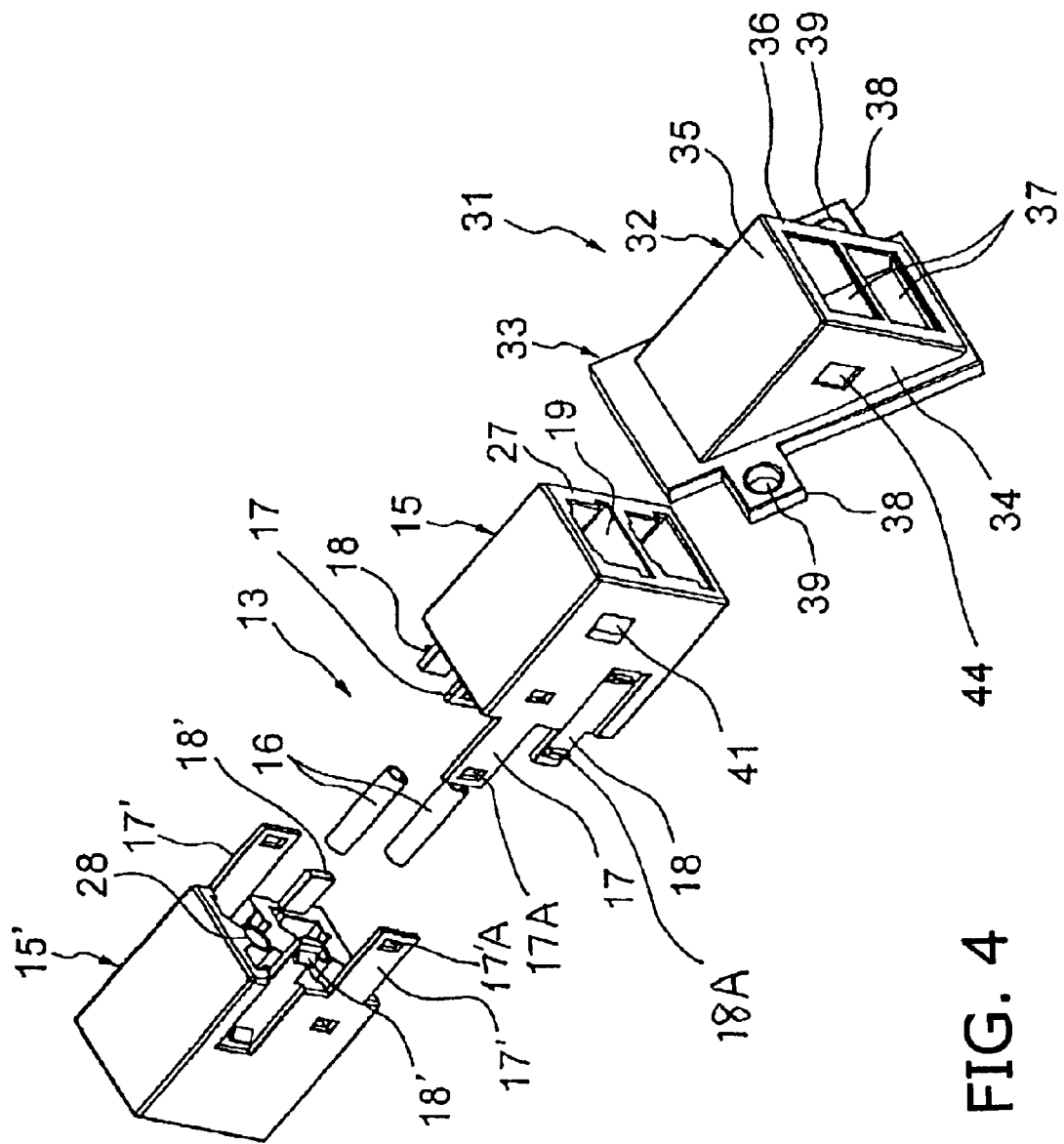
FIGS. 4 and 5 are exploded perspective views of a shield structure for an optical connector according to another embodiment of the present invention.
Figure 5:
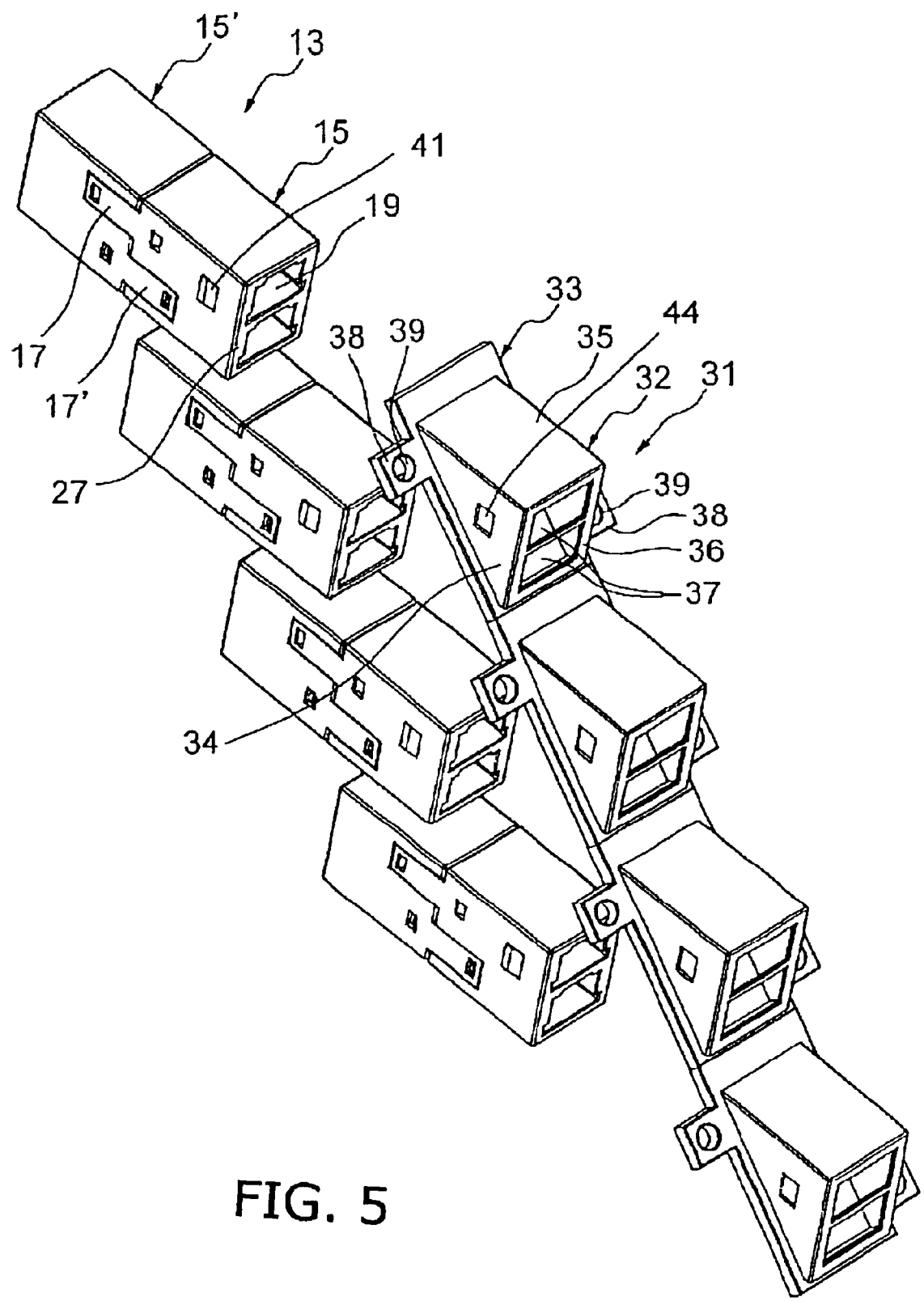
Figure 6:
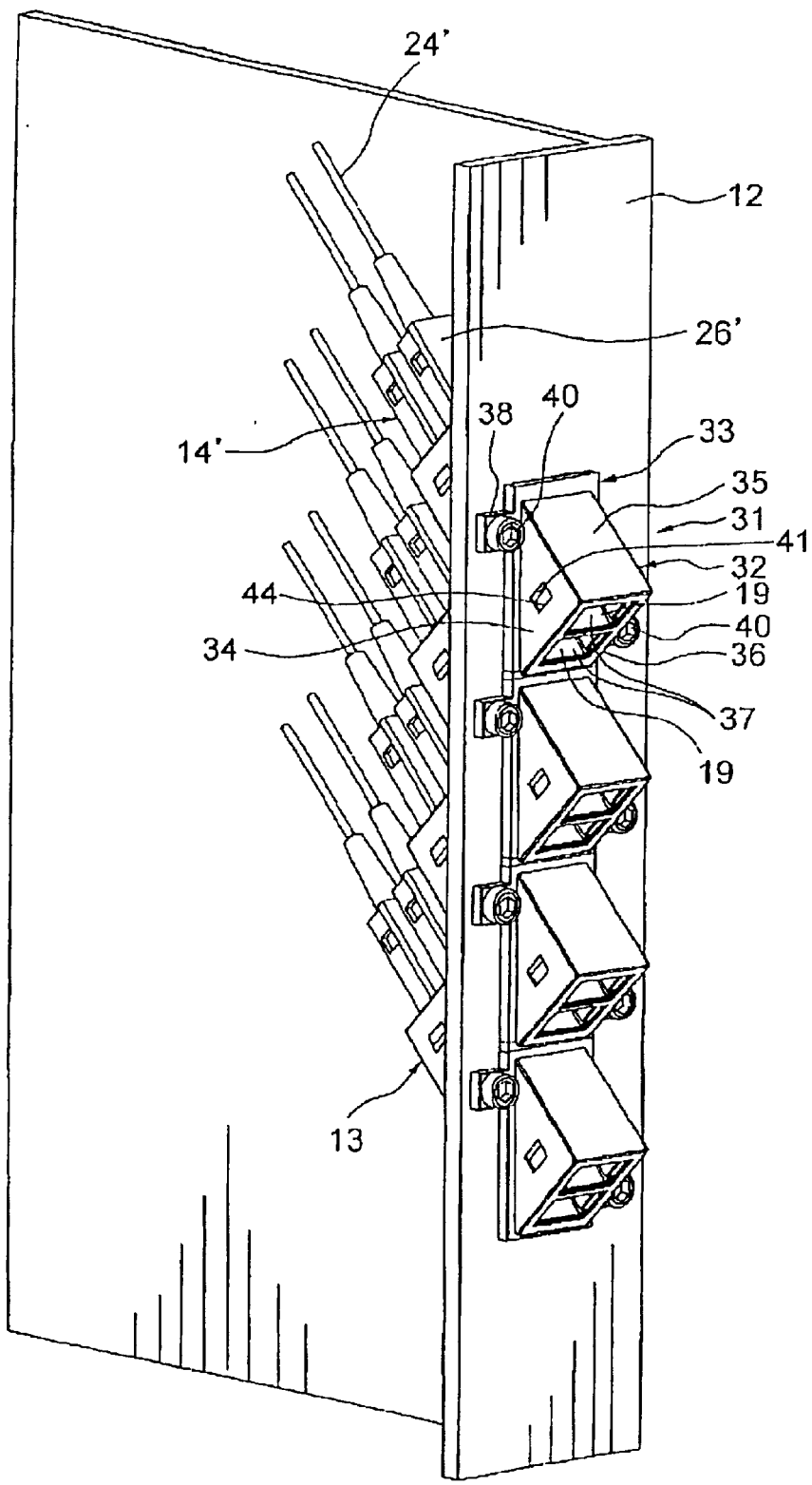
FIG. 6 is a perspective view of the shield structure.
Figure 7:
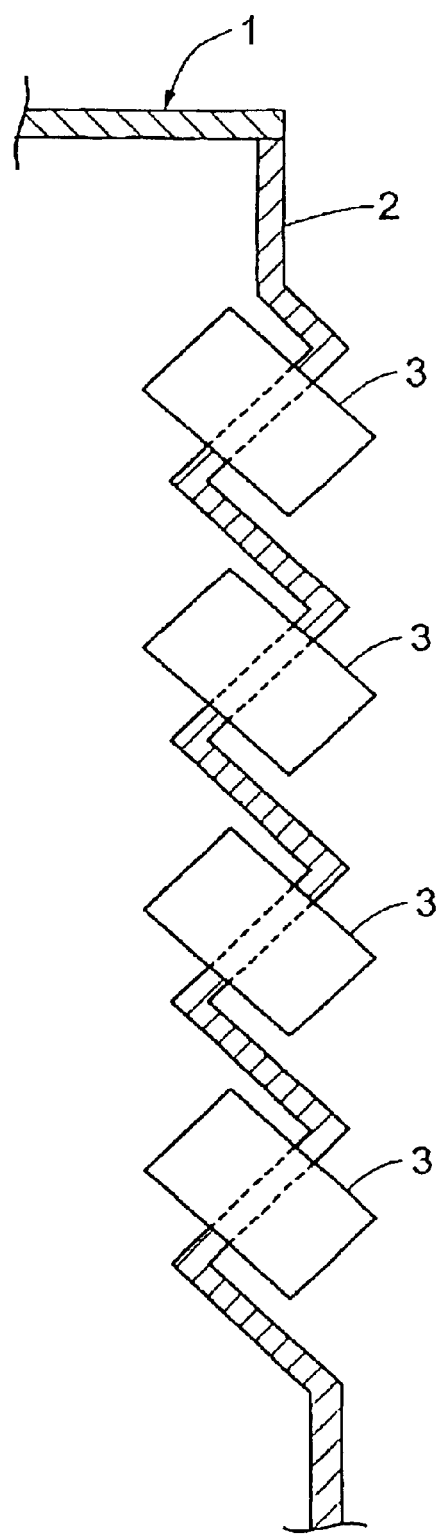
FIG. 7 is a schematic sectional view of a shield structure for an optical connector according to the prior art.

In the second embodiment shown in FIGS. 4–6, the same reference numbers are used for the same elements as those of the first embodiment in FIGS. 1 and 2.

A shield cover 31 is made of a metal and comprises a wedge-shaped adapter receiving cavity 32 for accommodating the adapter 31 and a panel fixing member 33 provided on the lower end of the adapter receiving cavity 32. The adapter receiving cavity 32 comprises triangular side surfaces 34, a rectangular upper surface 35, and an end surface 36 corresponding to side surfaces, an upper surface, and an end surface of the adapter 13, respectively. The end surface 36 has a pair of openings 37 corresponding to the plug engaging cavities 19. The side surfaces 34 have engaging projections 44 to engage with engaging holes 41 so that the adapter 13 is held by the shield cover 31. The panel fixing member 33 comprises a predetermined number, or two in the drawings, of projections 38 each having a round hole 39. Accordingly, the adapter 13 and the shield cover 31 are attached to the panel 12, being inclined with respect to the vertical direction by applying screws 40 into the panel 12 through the round holes 39.

In FIG. 5, four shield covers 31 are connected to each other. In FIG. 6, the connected shield covers 31 are fixed to the panel 12, and the tandem adapter 13 is inserted into each shield cover 31. In FIG. 5, since the plug engaging cavity 19 faces to the panel 12 downwardly on the slant, no light enters operator's eyes, thus protecting the operator's eyes during the assembly work. Since a plurality of the adapters 13 are integrally connected with each other, the assembling density is increased, and since the panel 12 does not require the complicated process, such as bending work, the manufacturing of the panel 12 is made simple.

As described above, the adapter 13 is attached to the panel 12 by tightening the screws through the round holes 39. However, other method may be used. For example, the shield cover 20 may be attached to the panel 14 by a screw, a fixing member other than the shield cover 20 may be employed, or the adapter 13 itself may have a fixing member, such as a screw, to be directly installed to the panel 12.

The shield cover 31 may shield only the peripheral wall surface of the adapter 13 without having the end surface 36. The Shape of the shield cover 20 is not limited to the wedge-shape but any shape may be employed, which permits the adapter 13 to be installed to the panel 12 at an inclined position with respect to the vertical direction. A plurality of the shield covers 31 may be integrally made instead of being connected.

Instead of shielding the adapter 13, shielding may be provided for a connector that comprises the plug 14' provided inside the panel 12 and fixed to the adapter 13 and a connector section provided outside the panel 12, into or from which the plug 14 is inserted or removed.

According to the present invention, since the adapter fixed to the panel is shielded by the shield cover, excellent shield effect is achieved. Since the adapter is inclined with respect to the panel, light does not enter operator's eyes upon insertion and removal of the plug, thus protecting the operator's eyes. Since the connected adapters are installed to the panel, the assembling work is easy and the assembling density is increased. In addition, since the adapter does not require a complicated process, such as bending work, to be fixed to the panel, the process for the panel is simplified.

What is claimed is:

1. A tandem type optical connector comprising:
   at least one tandem type adaptor including opposite plug engaging cavities each receiving an optical cable connector, at least one adaptor body of a resinous material, at least one cylindrical adjusting sleeve, and at least one engaging projection; and
   a shield cover provided outside said tandem type adaptor and including at least one panel fixing member having a panel receiving piece and a cantilever spring to attach said tandem type adaptor to a panel at an angle other than right angles with respect to said panel and at least one engaging hole for receiving said engaging projection to secure said adaptor body to said shield cover.

2. The tandem type optical connector according to claim 1, wherein said plug engaging cavities are provided in at least two tiers.

3. The tandem type optical connector according to claim 1, wherein said shield cover has a stepped rectangular shape and integrally shields at least two tandem type adaptors.

4. The tandem type optical connector according to claim 3, wherein said shield cover has at least two engaging holes for receiving said engaging projections to secure said tandem type adaptors.

* * * * *